(12) United States Patent
Hamilton et al.

(10) Patent No.: US 8,706,037 B1
(45) Date of Patent: Apr. 22, 2014

(54) ALTERNATIVE TRANSPORT MECHANISM SELECTION

(71) Applicant: Google Inc., Mountain View, CA (US)

(72) Inventors: Robert William Hamilton, Mountain View, CA (US); Martijn Franciscus Agnes Coenen, Mountain View, CA (US); Jeffrey William Hamilton, Austin, TX (US); Nicholas Julian Pelly, San Francisco, CA (US); Rachel Leah Garb, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/739,785

(22) Filed: Jan. 11, 2013

Related U.S. Application Data

(60) Provisional application No. 61/586,625, filed on Jan. 13, 2012.

(51) Int. Cl.
*H04B 7/00* (2006.01)

(52) U.S. Cl.
USPC ........... 455/41.2; 455/41.1; 455/41.3; 455/59

(58) Field of Classification Search
USPC ................................. 455/41.1, 41.2, 41.3, 59
See application file for complete search history.

(56) References Cited

U.S. PATENT DOCUMENTS

| | | | |
|---|---|---|---|
| 7,471,200 B2 | 12/2008 | Otranen | |
| 7,821,399 B2 | 10/2010 | Otranen | |
| 2008/0144586 A1* | 6/2008 | Kneckt et al. | 370/337 |
| 2009/0111378 A1 | 4/2009 | Sheynman et al. | |
| 2010/0184374 A1* | 7/2010 | Ohkita | 455/41.2 |
| 2010/0311327 A1* | 12/2010 | Hamada | 455/41.1 |
| 2012/0077433 A1* | 3/2012 | Walker et al. | 455/41.1 |
| 2012/0278192 A1* | 11/2012 | Shirron et al. | 705/26.1 |
| 2012/0290663 A1* | 11/2012 | Hsieh et al. | 709/206 |
| 2013/0005246 A1* | 1/2013 | Waters et al. | 455/41.1 |

* cited by examiner

*Primary Examiner* — Wen Huang
(74) *Attorney, Agent, or Firm* — Shumaker & Sieffert, P.A.

(57) ABSTRACT

Generally, aspects of the present disclosure are directed to techniques for determining a transport mechanism to transfer data peer-to-peer between computing devices. One or more alternative transport mechanisms supported by both a first computing device and a second computing device may be determined. The first computing device may determine whether to use one of near-field communication (NFC) and one of the one or more alternative transport mechanisms as a transport mechanism to transfer data between the first computing device and the second computing device based at least in part on at least one attribute of the data to be transferred. Data may be transferred between the first computing device and the second computing device using the transport mechanism.

17 Claims, 4 Drawing Sheets

ALTERNATIVE TRANSPORT MECHANISM SELECTION

RELATED APPLICATION

This application claims the benefit of U.S. Provisional Application No. 61/586,625, filed Jan. 13, 2012, the entire content of which is incorporated herein in its entirety.

TECHNICAL FIELD

The present disclosure relates to selecting alternative transport mechanisms for data transfer.

BACKGROUND

Typically, computing devices may include a variety of communication devices that support a variety of transport mechanisms for communicating and data transfer. Transport mechanisms may vary from each other in their communication range as well as their data throughput.

SUMMARY

In one aspect, the disclosure is directed to a method. The method may include determining a size of a payload to be transferred from a first computing device to a second computing device. The method may further include determining, based at least on the size of the payload, whether transfer of the payload from the first device to the second device via near-field communication (NFC) would exceed a specified time. The method may further include responsive to determining that the transfer of the payload from the first device to the second device via NFC would exceed the specified time, transferring the payload between the first computing device and the second computing device using an alternate transport mechanism.

In another aspect, the disclosure is directed to a method. The method may include determining one or more alternative transport mechanisms supported by both a first computing device and a second computing device. The method may further include determining, by the first computing device, whether to use one of near-field communication (NFC) and one of the one or more alternative transport mechanisms as a transport mechanism to transfer data between the first computing device and the second computing device based at least in part on at least one attribute of the data to be transferred. The method may further include transferring the data between the first computing device and the second computing device using the transport mechanism.

In another aspect, the disclosure is directed to a computing device. The computing device may include one or more processors. The computing device may further include a transport mechanism comparator operable by the one or more processors and configured to determine one or more alternative transport mechanisms supported by the computing device and an external computing device by comparing alternative transport mechanisms supported by the computing device with alternative transport mechanisms supported by the external computing device. The computing device may further include one or more communication devices configured to transport data using the one or more alternative transport mechanisms supported by the computing device and an external computing device. The computing device may further include a near-field communication (NFC) module configured to transport data using NFC and to receive an indication of the alternative transport mechanisms supported by the external computing device. The computing device may further include a transport mechanism selector operable by the one or more processors and configured to determine whether to use one of NFC and one of the one or more alternative transport mechanisms as a transport mechanism to transfer data between the computing device and the external computing device based at least in part on at least one attribute of the data to be transferred.

In another aspect, the disclosure is directed to a method. The method may include determining, by a first computing device, whether to use one of near-field communication (NFC) and an alternative transport mechanism as a transport mechanism to transfer data between the first computing device and a second computing device based at least in part on at least one attribute of the data to be transferred without determining if the alternative transport mechanism is supported by the second computing device. The method may further include transferring the data between the first computing device and the second computing device using the transport mechanism.

In another aspect, the disclosure is directed to a computer-readable medium containing instructions. The instructions, when executed by a programmable processor, may cause the programmable processor to perform operations. The operations may include determining, by a first computing device, whether to use one of near-field communication (NFC) and an alternative transport mechanism as a transport mechanism to transfer data between the first computing device and a second computing device based at least in part on at least one attribute of the data to be transferred without determining if the alternative transport mechanism is supported by the second computing device. The operations may further include transferring the data between the first computing device and the second computing device using the transport mechanism.

In another aspect, the disclosure is directed to a computing device. The computing device may include one or more processors. The computing device may further include one or more communication devices configured to transport data using an alternative transport mechanism. The computing device may further include a near-field communication (NFC) module configured to transport data using NFC. The computing device may further include a transport mechanism selector being operable by the one or more processors and configured to determine whether to use one of NFC and the alternative transport mechanism a transport mechanism to transfer data between the computing device and an external computing device based at least in part on at least one attribute of the data to be transferred.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
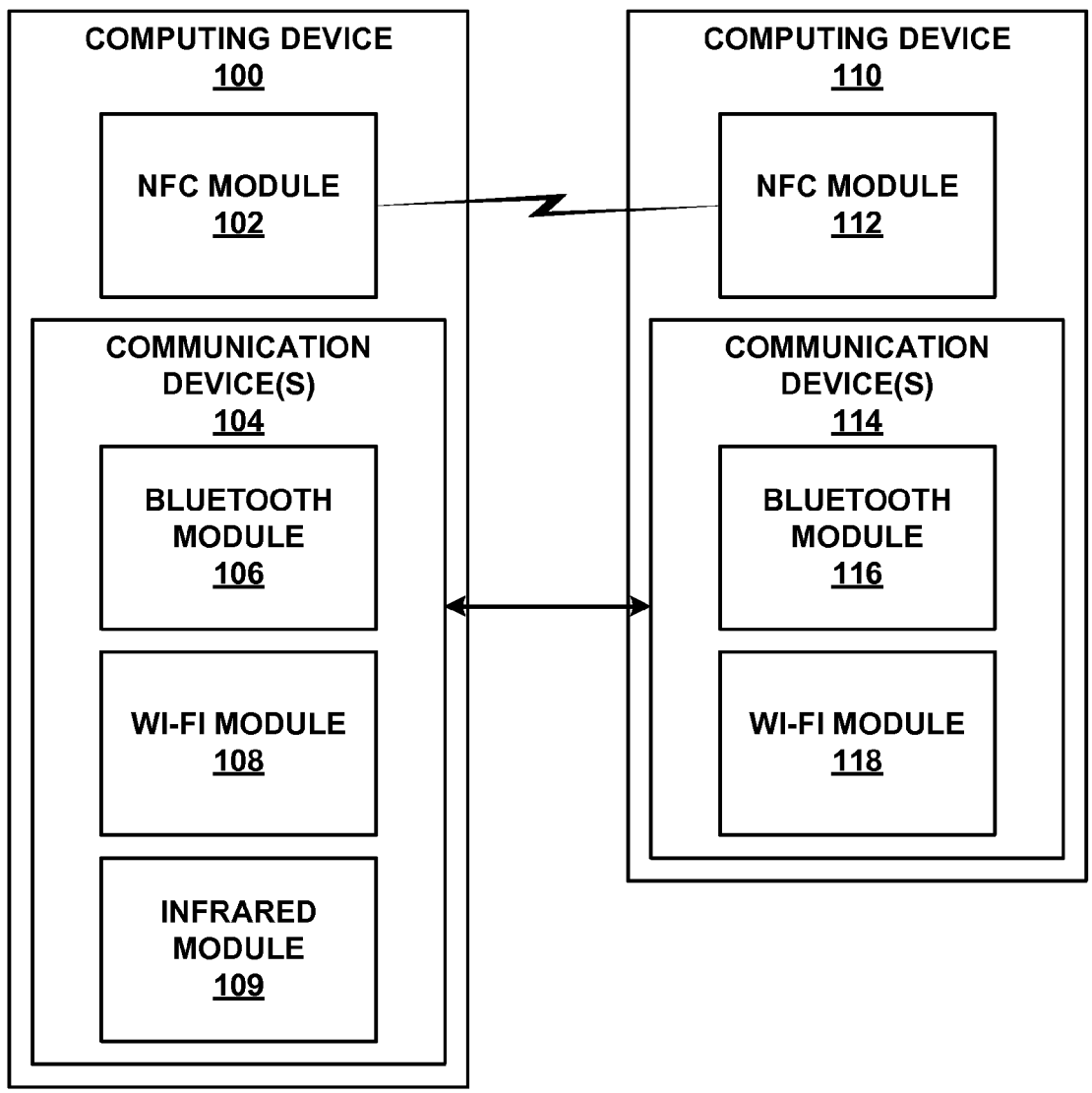
FIG. 1 is a block diagram illustrating an example first computing device transferring data with a second computing device according to some aspects of the present disclosure.

Generally, aspects of the present disclosure are directed to techniques for determining a transport mechanism to transfer data peer-to-peer between computing devices. While near-field communication (NFC)-enabled computing devices, such as NFC-enabled mobile phones, are able to quickly exchange data by simply tapping, bumping, or waving two NFC-enabled computing devices to initiate communications via NFC, NFC may not be an ideal transport mechanism for transferring large pieces of data between two computing devices due to its low data throughput (about 400 Kbit/s) because it may force users to hold their computing phones in contact with each other for an extended period of time to transfer large pieces of data.

Therefore, two computing devices may communicate via NFC to determine one or more alternative transport mechanisms supported by both computing devices in order to transfer larger pieces of data. An alternative transport mechanism, for the purposes of the present disclosure, may include any other transport mechanism supported by computing devices besides NFC. For example, alternative transport mechanisms may include but are not limited to one or more of: a Bluetooth transport mechanism, a Wi-Fi transport mechanism, an Infrared transport mechanism, a cellular data transport mechanism, and the like.

Data may be transferred between the two NFC-enabled computing devices via NFC or via one of the alternative transport mechanisms supported by both computing devices. Whether NFC or one of the alternative transport mechanisms is chosen as the transport mechanism for transferring the data between the computing devices may be determined based on at least one attribute of the data to be transferred, such as the size of the data. For example, if the data is smaller than a first threshold size, then the data may be transferred via NFC. Conversely, if the data is larger than the first threshold size and smaller than a second threshold size, then the data may be transferred via a higher-speed transport mechanism supported by both of the computing devices, such as a Bluetooth transport mechanism. If the data is larger than the second threshold size, then the data may be transferred via an even higher-speed transport mechanism supported by both of the computing devices, such as a Wi-Fi transport mechanism, and so on. The transport mechanisms for transfer data between the computing devices may typically be transport mechanisms that communicate peer-to-peer between computing devices. However, in some examples, it is possible that the data may also be transferred between the computing devices via a third-party remote system.

In some examples, it may be assumed that a modern computing device that supports NFC most likely also supports a common transport mechanism such as a Bluetooth transport mechanism. Therefore, if the data to be transferred is larger than a certain threshold size, or would take longer than a threshold period of time to transport via NFC, then a first computing device may simply transfer the data to a second computing device via the Bluetooth transport mechanism without determining which transport mechanisms are supported by both the computing devices.

Likewise, in some examples, the same assumption may also be made regarding support for a Wi-Fi transport mechanism. Therefore, if the data to be transferred is larger than a certain threshold size, or would take longer than a threshold period of time to transport via NFC, then a first computing device may simply transfer the data to a second computing device via the Wi-Fi transport mechanism without determining which alternative transport mechanisms are supported by both of the computing devices.

FIG. 1 is a block diagram illustrating an example computing device 100 transferring data with an example computing device 110. As shown in FIG. 1, a computing device 100 may include an NFC module 102 and one or more communication devices 104. The one or more communication devices 104 may include a Bluetooth module 106, a Wi-Fi module 108, and an infrared module 109. A computing device 110 may include an NFC module 112 and one or more communication devices 114. The one or more communication devices 114 may include a Bluetooth module 116 and a Wi-Fi module 118.

Examples of the computing devices 100 and 110 may include, but are not limited to, portable or mobile computing devices such as mobile phones (including smart phones), laptop computers, personal digital assistants (PDAs), portable gaming devices, portable media players, and e-book readers, as well as desktop computers, set top boxes, gaming systems, televisions, and the like, including a combination of two or more of these items.

The NFC modules 102 and 112 may operate in an active mode of operation. The NFC module 102 of the computing device 100 may generate a first radio field that is detected by the NFC module 112 of the computing device 110 in physical proximity to the computing device 100. In response, the NFC module 112 may generate a second radio field that is detected by the NFC module 102. In this way, data may be communicated between the computing devices 100 and 110, such as using peer-to-peer communication.

The computing device 100 may communicate with the computing device 110 via NFC by using the NFC module 102 of the computing device 100 and the NFC module 112 of the computing device 110. The computing device 100 communicating with the computing device 110 may include determining one or more alternative transport mechanisms supported by both the one or more communication devices 104 of the computing device 100 and the one or more communication devices 114 of the computing device 110. For example, the computing device 100 may request from the computing device 110 an indication of alternative transport mechanisms supported by the computing device 110, and in response the computing device 100 may receive from the computing device 110 the indication of the second transport mechanisms supported by the computing device 110. The indication of the alternative transport mechanisms supported by the computing device 110 may, for example, include a list of the alternative transport mechanisms supported by the computing device 110. Alternatively, the indication of alternative transport mechanisms supported by the computing device 110 may also include an indication or a list of the one or more communication devices 114 in the computing device 110. For example, the computing device 110 may send to the computing device 100 a list including the Bluetooth module 116 and the Wi-Fi module 118. The computing devices 100 and 110 may also exchange indications of alternative transport mechanisms supported by each of the respective computing devices 100 and 110, so that the computing device 110 may receive an indication of alternative transport mechanisms supported by the computing device 100, and the computing device 100 may receive an indication of alternative transport mechanisms supported by the computing device 110.

After receiving an indication of the alternative transport mechanisms supported by the computing device 110, the computing device 100 may compare the alternative transport mechanisms supported by the computing device 110 with the alternative transport mechanisms supported by the computing device 100 to determine the one or more alternative transport mechanisms supported by both of the computing devices 100 and 110. For example, the computing device 110 may send to the computing device 100 an indication that it supports a Bluetooth transport mechanism and a Wi-Fi transport mechanism. The computing device 100 may compare the Bluetooth and Wi-Fi transport mechanisms against the alternative transport mechanisms supported by the computing device 100, and may determine that the Bluetooth and Wi-Fi transport mechanisms are included in the alternative transport mechanisms supported by both computing devices 100 and 110.

In response to the computing device 100 receiving an indication of the one or more communication devices 114 in the computing device 110, the computing device 100 may compare the one or more communication devices 104 in the computing device 100 with the one or more communication devices 114 in the computing device 110 to determine one or more common communication devices in the computing device 100 and the computing device 110. For example, the computing device 100 may determine that the computing device 100 and the computing device 110 have Bluetooth modules 106 and 116 and Wi-Fi modules 108 and 118 in common, and the computing device 100 may be able to infer from the determination that that the Bluetooth and Wi-Fi transport mechanisms are the two alternative transport mechanisms supported by both computing devices 100 and 110.

After the computing devices 100 and 110 determine the alternative transport mechanisms supported by both the computing devices 100 and 110, the computing devices 100 and 110 may also communicate via NFC to pair or otherwise setup communications between the computing devices 100 and 110 via the alternative transport mechanisms supported by both the computing devices 100 and 110. For example, the computing devices 100 and 110 may communicate via NFC to pair their respective Bluetooth modules 106 and 116, or to setup a connection between their respective Wi-Fi modules 108 and 118, so that data may be transferred between the computing devices 100 and 110 using the alternative transport mechanisms.

After determining the one or more alternative transport mechanisms supported by both the computing devices 100 and 110, the computing device 100 may determine whether to use one of NFC and one of the one or more alternative transport mechanisms supported by both of the computing devices 100 and 110 as a transport mechanism based at least in part on at least one attribute of a data to be transferred to transfer the data between the computing devices 100 and 110. The at least one attribute of the data, such as the size of the data to be transferred. For example, if the data is smaller than a threshold size, then NFC may be selected as the transport mechanism. Alternatively, if the data is larger than a threshold size, then the one of the one or more alternative transport mechanisms may be selected as the transport mechanism.

Determining which one of the one or more alternative mechanisms to select as the transport mechanism may also be based on the size of the data to be transferred. For example, a Bluetooth transport mechanism and a Wi-Fi mechanism may be two alternative transport mechanisms supported by both the computing devices 100 and 110. Because the Wi-Fi transport mechanism may generally have better data throughput than the Bluetooth transport mechanism, the Wi-Fi transport mechanism may be an ideal transport mechanism for larger sized data than the Bluetooth transport mechanism. Therefore, if the size of the data is larger than a first threshold, then one of the Bluetooth and Wi-Fi transport mechanisms may be selected as the transport mechanism. If the size of the data is larger than the first threshold but smaller than a second threshold, then the Bluetooth transport mechanism may be selected as the transport mechanism. However, if the size of the data is larger than both the first threshold and the second threshold, then the Wi-Fi transport mechanism may be selected as the transport mechanism.

Determining whether to use one of NFC and one of the one or more alternative transport mechanisms supported by both of the computing devices 100 and 110 as a transport mechanism to transfer the data between the computing devices 100 and 110 may also be based on an estimated duration of data transfer between the computing devices 100 and 110. Because using NFC to communicate between the computing devices 100 and 110 may require the computing devices 100 and 110 to each be held in contact with or within a very short distance (about less than 5 centimeters) away from each other, it may potentially be undesirable to initiate a data transfer between the computing devices 100 and 110 using NFC if the transfer via NFC is estimated to last more than a couple of seconds. Therefore, NFC may be selected as the transport mechanism for transferring data between the computing devices 100 and 110 if the duration of the data transfer via NFC is estimated to be less than a threshold amount of time. Alternatively, one of the one or more alternative transport mechanisms may be selected as the transport mechanism for transferring data between the computing devices 100 and 110 if the duration of the data transfer via NFC is estimated to be more than a threshold amount of time.

Determining which one of the one or more alternative mechanisms to select as the transport mechanism may also be based on the estimated duration of data transfer between the computing devices 100 and 110. For example, Bluetooth and Wi-Fi transport mechanisms may be two alternative transport mechanisms supported by both the computing device 100 and the computing device 110. Because the Wi-Fi transport mechanism may have better data throughput than the Bluetooth transport mechanism, the Wi-Fi transport mechanism may be an ideal transport mechanism for larger data sizes than the Bluetooth transport mechanism. Therefore, if the estimated duration of data transfer using NFC is longer than a first threshold, then one of the Bluetooth and Wi-Fi transport mechanisms may be selected as the transport mechanism. If, for a data transfer, the estimated duration of data transfer using NFC is longer than a first threshold, and the estimated duration of data transfer using the Bluetooth transport mechanism is shorter than a second threshold amount of time, then the Bluetooth transport mechanism may be selected as the transport mechanism. However, if the estimated duration of data transfer using the Bluetooth transport mechanism is longer than the second threshold amount of time, then the Wi-Fi transport mechanism may be selected as the transport mechanism.

The data may be transferred between the computing device 100 and the second computing device 110 using the selected transport mechanism. If NFC is the selected transport mechanism, then data may be transferred using NFC between the NFC module 102 in the computing device 100 and the NFC module 112 in the computing device 110. If the Bluetooth transport mechanism is the selected transport mechanism, then data may be transferring using the Bluetooth transport mechanism between the Bluetooth module 106 in the computing device 100 and the Bluetooth module 116 in the computing device 110. If the Wi-Fi transport mechanism is the selected transport mechanism, then data may be transferred using the Wi-Fi transport mechanism between the Wi-Fi module 108 in the computing device 100 and the Wi-Fi module 118 in the computing device 110.

In some examples, the computing device 100 may transfer data to the computing device 110 using an alternative transport mechanism without first determining if the alternative transport mechanism is supported by the computing device 110. For example, the computing device 100 may select the Bluetooth transport mechanism or the Wi-Fi transport mechanism as the transport mechanism for transferring data to the computing device 110 without first determining if the computing device 110 supports the Bluetooth transport mechanism or the Wi-Fi transport mechanism. Rather, an assumption may be made that a computing device that supports NFC will most likely also support the Bluetooth and Wi-Fi transport mechanisms.

The computing device 100 may determine whether to use one of NFC and an alternative transport mechanism as the transport mechanism to transfer data to the computing device 110 based at least in part on the size of the data to be transferred. For example, if the data is smaller a threshold size, then NFC may be selected as the transport mechanism for the data. Alternatively, if the data is larger than a threshold size, then the alternative transport mechanism may be selected as the transport mechanism for the data.

Selecting the alternative transport mechanism may include determining which one of the alternative transport mechanisms supported by the computing device 100 to select as the transport mechanism for transferring the data. The determining may be based on the size of the data to be transferred. For example, Bluetooth and Wi-Fi transport mechanisms may be two of the alternative transport mechanisms supported by the computing device 100. Because the Wi-Fi transport mechanism may generally have better data throughput than the Bluetooth transport mechanism, the Wi-Fi transport mechanism may be an ideal transport mechanism for larger data sizes as compared with the Bluetooth transport mechanism. Therefore, if the data is larger than a first threshold size, then one of the Bluetooth and Wi-Fi transport mechanisms may be selected as the transport mechanism. If the data is larger than the first threshold size but smaller than a second threshold size, then the Bluetooth transport mechanism may be selected as the transport mechanism. However, if the data is larger than both the first threshold size and the second threshold size, then the Wi-Fi transport mechanism may be selected as the transport mechanism.

Figure 2:
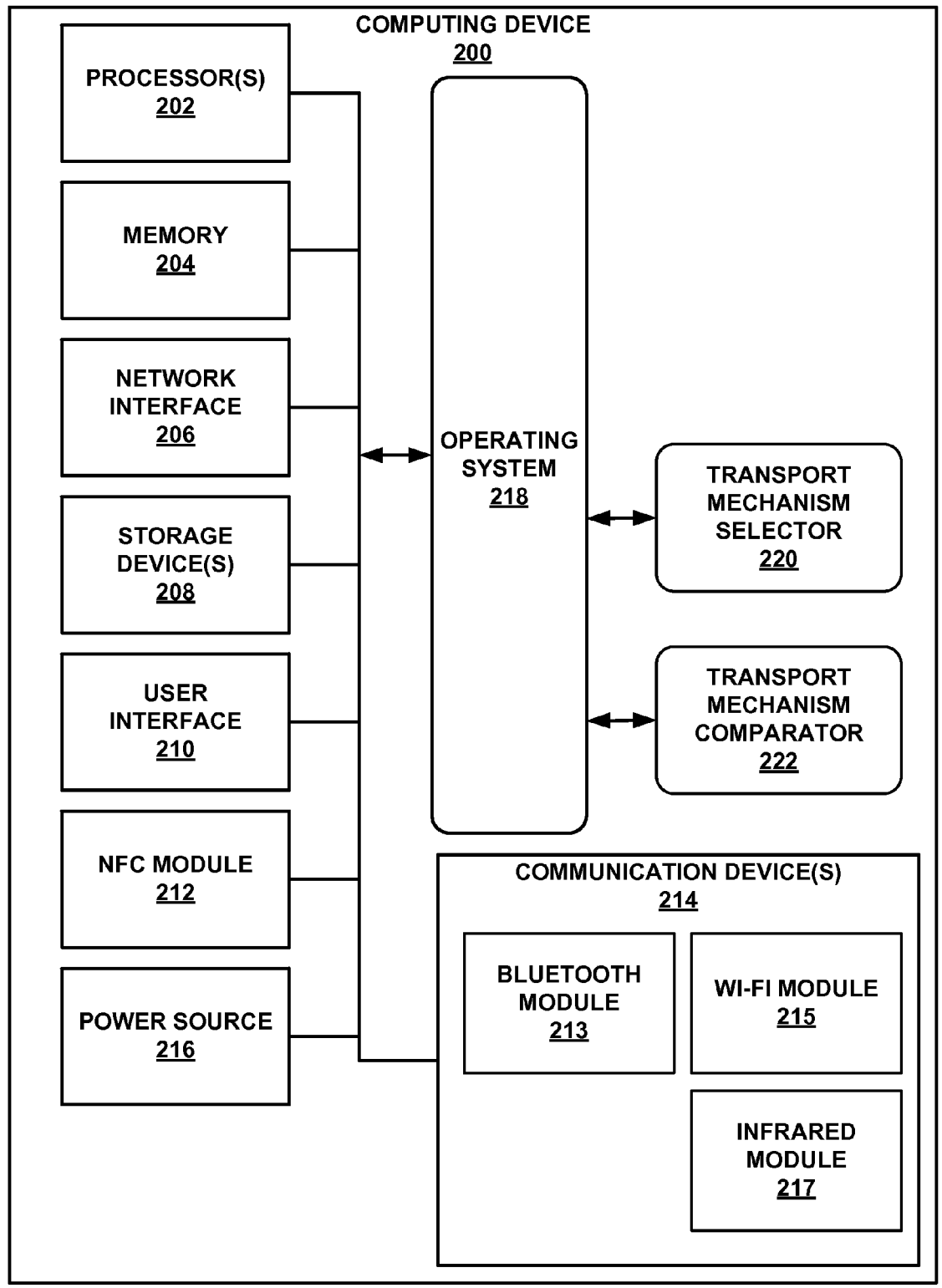
FIG. 2 is a block diagram illustrating an example computing device according to some aspects of the present disclosure.

FIG. 2 illustrates a block diagram illustrating components of an example computing device 200, such as the computing device 100 and the computing device 110 of FIG. 1. FIG. 2 illustrates only one particular example of the computing device 200, and many other examples of the computing device 200 may be used in other instances.

As shown in the specific example of FIG. 2, the computing device 200 may include one or more processors 202, a memory 204, a network interface 206, one or more storage devices 208, a user interface 210, an NFC module 212, one or more communication devices 214, and a power source 216. The computing device 200 may also include an operating system 218, which may include modules and/or applications that are executable by the one or more processors 202 and the computing device 200. The computing device 200, in one example, may also include a transport mechanism selector, which may be executable by the one or more processors 202 of the computing device 200. Each of the components 202, 204, 206, 208, 210, 212, 214, 216, 218, and 220 may be interconnected (physically, communicatively, and/or operatively) for inter-component communications.

The one or more processors 202, in one example, may be configured to implement functionality and/or process instructions for execution within the computing device 200. For example, the one or more processors 202 may be capable of processing instructions stored in the memory 204 or instructions stored on the one or more storage devices 208. These instructions may define or otherwise control the operation of the operating system 218, and the transport mechanism selector 220.

The memory 204 may, in one example, be configured to store information within the computing device 200 during operation. The memory 204, in some examples, may be described as a computer-readable storage medium. In some examples, the memory 204 may be a temporary memory, meaning that a primary purpose of the memory 204 is not long-term storage. The memory 204 may, in some examples, be described as a volatile memory, meaning that the memory 204 does not maintain stored contents when the computing device 200 is turned off. Examples of volatile memories may include random access memories (RAM), dynamic random access memories (DRAM), static random access memories (SRAM), and other forms of volatile memories known in the art. In some examples, the memory 204 may be used to store program instructions for execution by the one or more processors 202. The memory 204 may, in one example, be used by software or applications running on the computing device 200 (e.g., the transport mechanism selector 220) to temporarily store information during program execution.

The one or more storage devices 208 may, in some examples, also include one or more computer-readable storage media. The one or more storage devices 208 may be configured to store larger amounts of information than the memory 204. The one or more storage devices 208 may further be configured for long-term storage of information. In some examples, the one or more storage devices may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

The computing device 200 may, in some examples, also include the network interface 206. The computing device 200 may, in one example, use the network interface 206 to communicate with external devices via one or more networks. The network interface 206 may be a network interface card, such as an Ethernet card, an optical transceiver, a radio frequency transceiver, or any other type of device that can send and receive information. Other examples of such network interfaces may include Bluetooth, 3G and Wi-Fi radios in mobile computing devices as well as USB. In some examples, the computing device 200 may use the network interface 206 to wirelessly communicate with an external device such as a server, mobile phone, or other networked computing device.

The computing device 200 may, in one example, also include the user interface 210. The user interface 210 may be configured to receive input from a user (e.g., tactile, audio, or video feedback). The user interface 210 may include a touch-sensitive and/or a presence-sensitive screen or display, mouse, a keyboard, a voice responsive system, or any other type of device for detecting a command from a user. In some examples, the user interface 210 may include a touch-sensitive screen, mouse, keyboard, microphone, or camera.

The user interface 210 may also include, combined or separate from input devices, output devices. In this manner, the user interface 210 may be configured to provide output to a user using tactile, audio, or video stimuli. In one example, the user interface 210 may include a touch-sensitive screen or display, sound card, a video graphics adapter card, or any other type of device for converting a signal into an appropriate form understandable to humans or machines. In addition, the user interface 210 may include a speaker, a cathode ray tube (CRT) monitor, a liquid crystal display (LCD), or any other type of device that can generate intelligible output to a user.

The computing device 200, in some examples, may include a power source 216, which may be a rechargeable battery and may provide power to the computing device 200. The power source 216 may, in some examples, be a battery made from nickel-cadmium, lithium-ion, or other suitable material. In other examples, the power source 216 may be a power source capable of providing stored power or voltage from another power source.

In addition, the computing device 200 may include the NFC module 212, such as the NFC module 102 or the NFC device 112 of FIG. 1. As described herein, the NFC module 212 may be active hardware that is configured to communicate with other NFC devices. In general, the NFC module 212 may be configured to communicate wirelessly with other devices in physical proximity to NFC module 212 (e.g., less than approximately ten centimeters, or less than approximately four centimeters). In other examples, the NFC module 212 may be replaced with an alternative short-range communication device configured to communicate with and receive data from other short-range communication devices. These alternative short-range communication devices may operate according to Bluetooth, Ultra-Wideband radio, or other similar protocols. In some examples, the NFC module 212 may be an external hardware module that is coupled with computing device 200 via a bus (such as via a Universal Serial Bus (USB) port). The NFC module 212, in some examples, may also include software which may, in some examples, be independent from the operating system 218, and which may, in some other examples, be a sub-routine of the operating system 218.

The computing device 200 may also include the one or more communication devices 214. The one or more communication devices 214 may, in some examples, be configured to transfer data between the computing device 200 and an external computing device using one or more alternative transport mechanisms. The one or more communication devices 214, in some examples, may include one or more of: a Bluetooth module 213, a Wi-Fi module 215, an infrared module 217, and any other communication modules. It should be understood that the one or more communication devices 214 may include any number and type of communication modules, and may include one or more communication modules not shown in FIG. 2.

The computing device 200 may also include the operating system 218. The operating system 218 may, in some examples, control the operation of components of the computing device 200. For example, the operating system 218 may, in one example, facilitate the interaction of the transport mechanism selector 220 and the transport mechanism comparator 222 with the one or more processors 202, the memory 204, the network interface 206, the one or more storage devices 208, the user interface 210, the NFC module 212, the Bluetooth module 214, and the power source 216.

The transport mechanism selector 220 may be an application being executed on the one or more processors 202 that may be configured to determine whether to use one of NFC and one of the one or more alternative transport mechanisms as a transport mechanism to transfer data between the computing device 200 and an external computing device (not shown) based at least in part on at least one attribute of the data to be transferred. The transport mechanism selector 220 may determine the transport mechanism based on attributes of the data to be transferred, such as the size of the data to be transferred. For example, if the data is smaller than a threshold size, then the transport mechanism selector 220 may select NFC as the transport mechanism. Alternatively, if the data is larger than a threshold size, then the transport mechanism selector 220 may select the one of the one or more alternative transport mechanisms as the transport mechanism.

After the transport mechanisms selector 220 selects one of the one or more alternative transport mechanisms over NFC as the transport mechanism, the transport mechanism selector 220 may also determine which one of the one or more alternative mechanisms to select as the transport mechanism. The determining may be based on the size of the data to be transferred. For example, a Bluetooth transport mechanism and a Wi-Fi transport mechanism may be two alternative transport mechanisms supported by both the computing device 200 and the external device. Because the Wi-Fi transport mechanism may have better data throughput than the Bluetooth transport mechanism, the Wi-Fi transport mechanism may be an ideal transport mechanism for larger data as opposed to the Bluetooth transport mechanism. Therefore, if the data is larger than a first threshold size, then the transport mechanism selector 220 may select one of the Bluetooth transport mechanism or the Wi-Fi transport mechanism as the transport mechanism to transfer the data. If the data is larger than the first threshold size but smaller than a second threshold size, then the transport mechanism selector 220 may select the Bluetooth transport mechanism as the transport mechanism. However, if the data is larger than both the first threshold size and the second threshold size, then the transport mechanism selector 220 may select the Wi-Fi transport mechanism as the transport mechanism.

The transport mechanism selector 220 may also select a transport mechanism to transfer data between the computing device 200 and the external device based on an estimated duration of data transfer. Because using NFC to communicate between the computing device 200 and the external device may require the computing device 200 and the external device to each be held in contact with or within a very short distance (about less than 5 centimeters) away from each other, it may potentially be undesirable to initiate a data transfer between the computing device 200 and the external device using NFC if the transfer via NFC is estimated to last more than a couple of seconds. Therefore, the transport mechanism selector 220 may select NFC as the transport mechanism for transferring data between the computing device 200 and the external computing device if the duration of the data transfer via NFC is estimated to be less than a threshold amount of time. Alternatively, the transport mechanism selector 220 may select one of the one or more alternative transport mechanisms as the transport mechanism for transferring data between the computing device 200 and the external computing device if the duration of the data transfer via NFC is estimated to be more than a threshold amount of time.

The transport mechanism selector 220 may also determine which one of the one or more alternative mechanisms shared by the computing device 200 and the external device to select as the transport mechanism to transfer data based on the estimated duration of data transfer between the computing device 200 and the external device. For example, a Bluetooth transport mechanism and a Wi-Fi transport mechanism may be two alternative transport mechanisms supported by both the computing device 200 and the external device. Because the Wi-Fi transport mechanism may have better data throughput than the Bluetooth transport mechanism, the Wi-Fi transport mechanism may be an ideal transport mechanism for larger data sizes as opposed to the Bluetooth transfer mechanism. Therefore, if the estimated duration of data transfer using NFC is longer than a first threshold, then the transport mechanism selector 220 may select one of the Bluetooth transport mechanism or the Wi-Fi transport mechanism as the transport mechanism to transfer the data. If the estimated duration of the data transfer using NFC is longer than a first threshold, and the estimated duration of data transfer using the Bluetooth transport mechanism is shorter than a second threshold amount of time, then the transport mechanism selector 220 may select the Bluetooth transport mechanism as the transport mechanism. However, if the estimated duration of data transfer using the Bluetooth transport mechanism is longer than the second threshold amount of time, then the transport mechanism selector 220 may select the Wi-Fi transport mechanism as the transport mechanism to transfer the data.

The data may be transferred between the computing device 200 and the external device using the selected transport mechanism. If NFC is the selected transport mechanism, then data may be transferred using NFC via the NFC module 212. If the Bluetooth transport mechanism is the selected transport mechanism, then data may be transferring using the Bluetooth transport mechanism via the Bluetooth module 213. If the Wi-Fi transport mechanism is the selected transport mechanism, then data may be transferred using the Wi-Fi transport mechanism via the Wi-Fi module 215.

In some examples, the computing device 200 may transfer data to the external device using an alternative transport mechanism without first determining if the alternative transport mechanism is supported by the external device. For example, the computing device 200 may select the Bluetooth transport mechanism or the Wi-Fi transport mechanism as the transport mechanism for transferring data to the external device without determining if the external device also supports the Bluetooth transport mechanism or the Wi-Fi transport mechanism. Rather, an assumption may be made that a computing device that supports NFC will most likely also support the Bluetooth transport mechanism and the Wi-Fi transport mechanism.

The transport mechanism selector 220 may determine whether to use one of NFC and an alternative transport mechanism as the transport mechanism to transfer data to the computing device 110 based at least in part on the size of the data to be transferred. For example, if the data is smaller a threshold size, then the transport mechanism selector 220 may select NFC as the transport mechanism for the data. Alternatively, if the data is larger than a threshold size, then the transport mechanism selector 220 may select the alternative transport mechanism as the transport mechanism for the data.

Selecting the alternative transport mechanism may include determining which one of the alternative transport mechanisms supported by the computing device 100 to select as the transport mechanism for transferring the data. The determining may be based on the size of the data to be transferred. For example, the Bluetooth and Wi-Fi transport mechanisms may be two of the alternative transport mechanisms supported by the computing device 100. Because the Wi-Fi transport mechanism may generally have better data throughput than the Bluetooth transport mechanism, the Wi-Fi transport mechanism may be an ideal transport mechanism for larger data sizes as compared with the Bluetooth transport mechanism. Therefore, if the data is larger than a first threshold size, then the transport mechanism selector 220 may select one of the Bluetooth transport mechanism or the Wi-Fi transport mechanism as the transport mechanism. If the data is larger than the first threshold size but smaller than a second threshold size, then the transport mechanism selector may select the Bluetooth transport mechanism as the transport mechanism. However, if the data is larger than both the first threshold size and the second threshold size, then the transport mechanism selector may select the Wi-Fi transport mechanism as the transport mechanism.

The transport mechanism comparator 222 may be an application being executed on the one or more processors 202 that may be configured to determine one or more alternative transport mechanisms supported by the computing device 200 and an external computing device (not shown) such as by, for example, comparing alternative transport mechanisms supported by the computing device 200 with alternative transport mechanisms supported by the external computing device. The transport mechanism comparator 222 may request and receive from the external device an indication of alternative transport mechanisms supported by the external device. The indication of alternative transport mechanisms supported by the external device may be a list of alternative transport mechanisms supported by the external device, or may be an indication or a list of one or more communication devices in the external computing device. The computing device 200 and the external device may also exchange indications of alternative transport mechanisms supported by the computing device 200 and the external device, so that the computing device 200 may receive an indication of alternative transport mechanisms supported by the external device, and the external device may receive an indication of alternative transport mechanisms supported by the computing device 200.

After receiving an indication of the alternative transport mechanisms supported by the external computing device, the transport mechanism comparator 222 may compare the alternative transport mechanisms supported by the computing device 200 with the alternative transport mechanisms supported by the external computing device to determine the one or more alternative transport mechanisms supported by both the computing device 200 and the external device. For example, external computing device may send to the computing device 200 an indication that the external computing device supports the Bluetooth and Wi-Fi transport mechanisms. The transport mechanism comparator 222 may compare the Bluetooth and Wi-Fi transport mechanisms against the alternative transport mechanisms supported by the computing device 100, and may determine that the Bluetooth and Wi-Fi transport mechanisms are included in the alternative transport mechanisms supported by both the computing device 200 and the external computing device.

In response to the transport mechanism comparator 222 receiving an indication of the one or more communication devices in the external computing device, the transport mechanism comparator 222 may compare the one or more communication devices 214 in the computing device 200 with the one or more communication devices in the external computing device to determine one or more common communication devices in the computing device 200 and the external device.

Any applications (e.g., the transport mechanism selector 220 and the transport mechanism comparator 222) implemented within or executed by the computing device 200 may be implemented or contained within, operable by, executed by, and/or be operatively/communicatively coupled to components of the computing device 200 (e.g., the one or more processors 202, the memory 204, the network interface 206, the one or more storage devices 208, the user interface 210, the NFC module 212, the one or more communication devices 214, and/or the power source 216).

Figure 3:
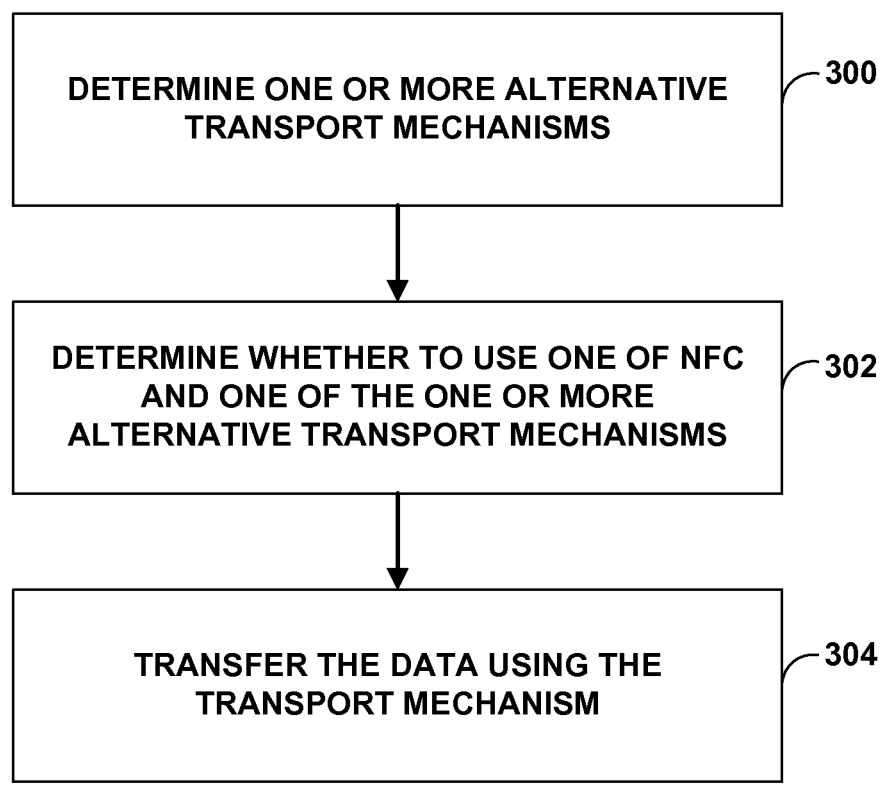
FIG. 3 is a flowchart illustrating an example method for selecting a transport mechanism according to some aspects of the present invention.

FIG. 3 is a flow chart illustrating an example operation of a method for transferring data between a first computing device and a second computing device. The method may include determining one or more alternative transport mechanisms supported by both a first computing device and a second computing device (300). The method may further include determining, by the first computing device, whether to use one of NFC and one of the one or more alternative transport mechanisms as a transport mechanism to transfer data between the first computing device and the second computing device based at least in part on at least one attribute the data to be transferred (302). The method may further include transferring the data between the first computing device and the second computing device using the transport mechanism (304).

Determining the one or more alternative transport mechanisms may include receiving, by the first computing device, an indication of one or more alternative transport mechanisms supported by the second computing device, and comparing the information with one or more alternative transport mechanisms supported by the first computing device. The one or more alternative transport mechanisms may include a Bluetooth transport mechanism. The one or more alternative transport mechanisms may also include a Wi-Fi transport mechanism.

Determining whether to use one of NFC and one of the one or more alternative transport mechanisms may be based on an estimated duration of transferring the data via NFC between the first computing device and the second computing device. Determining whether to use one of NFC and one of the one or more alternative transport mechanisms may also include selecting NFC as the transport mechanism if the estimated duration is shorter than a threshold amount of time. Determining whether to use one of NFC and one of the one or more alternative transport mechanisms may also include selecting one of the one or more alternative transport mechanisms as the transport mechanism if the estimated duration is longer than a threshold amount of time.

Determining whether to use one of NFC and one of the one or more alternative transport mechanisms may be based on the size of the data. Determining whether to use one of NFC and one of the one or more alternative transport mechanisms may also include selecting NFC as the transport mechanism if the data is smaller than a threshold size. Determining whether to use one of NFC and one of the one or more alternative transport mechanisms may also include selecting one of the one or more alternative transport mechanisms as the transport mechanism if the data is larger than a threshold size.

Figure 4:
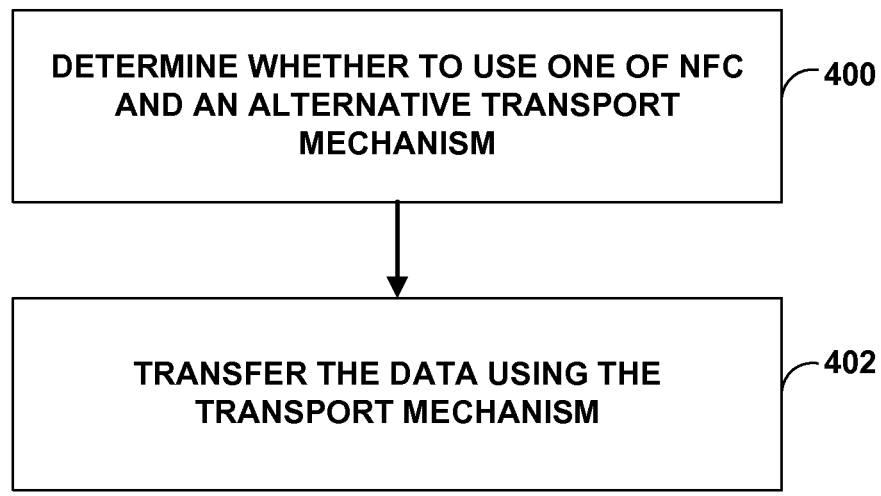
FIG. 4 is a flowchart illustrating an example method for selecting a transport mechanism according to some aspects of the present invention.

FIG. 4 is a flow chart illustrating an example operation of another method for transferring data between a first computing device and a second computing device. The method may include determining, by a first computing device, whether to use one of NFC and an alternative transport mechanism as a transport mechanism to transfer data between the first computing device and a second computing device based on the data to be transferred without determining if the alternative transport mechanism is supported by the second computing device (400). The method may further include transferring the data between the first computing device and the second computing device using the transport mechanism (402).

In some examples, the alternative transport mechanism may be a Bluetooth transport mechanism or a Wi-Fi transport mechanism. Determining whether to use one of NFC and the alternative transport mechanisms may be based on an estimated duration of transferring the data between the first computing device and the second computing device via NFC. For example, determining whether to use one of NFC and the alternative transport mechanisms may include selecting NFC as the transport mechanism if the estimated duration is shorter than a threshold amount of time. Alternatively, determining whether to use one of NFC and the alternative transport mechanisms may include selecting the alternative transport mechanism as the transport mechanism if the estimated duration is longer than a threshold amount of time.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

The invention claimed is:

1. A method comprising:
determining a size of a payload to be transferred from a first computing device to a second computing device;

determining, based at least on the size of the payload, whether transfer of the payload from the first device to the second device via near-field communication (NFC) would exceed a first specified time; and responsive to determining that the transfer of the payload from the first device to the second device via NFC would exceed the first specified time, and further responsive to determining that the transfer of the payload from the first device to the second device via a first alternative transport mechanism would not exceed a second specified time, transferring the payload between the first computing device and the second computing device using the first alternate transport mechanism; and responsive to determining that the transfer of the payload from the first device to the second device via the first alternative transport mechanism would exceed the second specified time, transferring the payload between the first computing device and the second computing device using a second alternative transport mechanism.

2. The method of claim 1, wherein at least one of the first specified time and the second specified time includes a user-specified time.

3. The method of claim 1, wherein at least one of the first specified time and the second specified time includes a default time.

4. The method of claim 1, wherein at least one of the first alternative transport mechanism and the second alternative transport mechanism comprises a Wi-Fi transport mechanism.

5. The method of claim 1, wherein at least one of the first alternative transport mechanism and the second alternative transport mechanism comprises a Bluetooth transport mechanism.

6. A method comprising:
determining one or more alternative transport mechanisms supported by both a first computing device and a second computing device;
determining, by the first computing device, whether to use one of near-field communication (NFC) and one of the one or more alternative transport mechanisms as a transport mechanism to transfer data between the first computing device and the second computing device based at least in part on at least one attribute of the data to be transferred;
responsive to determining to use the one of the one or more alternative transport mechanisms as the transport mechanism, determining, by the first computing device, whether to use a first one of the one or more alternative transport mechanisms or a second one of the one or more alternative transport mechanisms as the transport mechanism based at least in part on the at least one attribute of the data to be transferred; and
transferring the data between the first computing device and the second computing device using the transport mechanism.

7. The method of claim 6, wherein determining the one or more alternative transport mechanisms comprises:
receiving, by the first computing device, an indication of one or more alternative transport mechanisms supported by the second computing device; and
comparing the indication with one or more alternative transport mechanisms supported by the first computing device.

8. The method of claim 6, wherein determining whether to use one of NFC and one of the one or more alternative transport mechanisms is based at least in part on an estimated duration of transferring the data via NFC between the first computing device and the second computing device.

9. The method of claim 8, wherein determining whether to use one of NFC and one of the one or more alternative transport mechanisms comprises:
selecting NFC as the transport mechanism if the estimated duration is shorter than a threshold amount of time.

10. The method of claim 8, wherein determining whether to use one of NFC and one of the one or more alternative transport mechanisms comprises:
selecting one of the one or more alternative transport mechanisms as the transport mechanism if the estimated duration is longer than a threshold amount of time.

11. The method of claim 6, wherein determining whether to use one of NFC and one of the one or more alternative transport mechanisms is based at least in part on a size of the data.

12. The method of claim 11, wherein determining whether to use one of NFC and one of the one or more alternative transport mechanisms comprises:
selecting NFC as the transport mechanism if the data is smaller than a threshold size.

13. The method of claim 11, wherein determining whether to use one of NFC and one of the one or more alternative transport mechanisms comprises:
selecting one of the one or more alternative transport mechanisms as the transport mechanism if the data is larger than a threshold size.

14. The method of claim 6, wherein the one or more alternative transport mechanisms comprises a Bluetooth transport mechanism.

15. The method of claim 6, wherein the one or more alternative transport mechanisms comprises a Wi-Fi transport mechanism.

16. A computer-readable medium comprising instructions that, when executed by at least one programmable processor, causes the programmable processor to perform operations comprising:
determining one or more alternative transport mechanisms supported by both a first computing device and a second computing device;
determining, by the first computing device, whether to use one of near-field communication (NFC) and one of the one or more alternative transport mechanisms as a transport mechanism to transfer data between the first computing device and the second computing device based at least in part on at least one attribute of the data to be transferred;
responsive to determining to use the one of the one or more alternative transport mechanisms as the transport mechanism, determining, by the first computing device, whether to use a first one of the one or more alternative transport mechanisms or a second one of the one or more alternative transport mechanisms as the transport mechanism based at least in part on the at least one attribute of the data to be transferred; and
transferring the data between the first computing device and the second computing device using the transport mechanism.

17. A computing device comprising:
one or more processors;
a transport mechanism comparator operable by the one or more processors and configured to determine one or more alternative transport mechanisms supported by the computing device and an external computing device by comparing alternative transport mechanisms supported by the computing device with alternative transport mechanisms supported by the external computing device;

one or more communication devices configured to transport data using the one or more alternative transport mechanisms supported by the computing device and an external computing device;

a near-field communication (NFC) module configured to transport data using NFC and to receive an indication of the alternative transport mechanisms supported by the external computing device; and a transport mechanism selector operable by the one or more processors and configured to determine whether to use one of near-field communication (NFC) and one of the one or more alternative transport mechanisms as a transport mechanism to transfer data between the computing device and the external computing device based at least in part on at least one attribute of the data to be transferred, wherein the transport mechanism selector is further configured to, responsive to determining to use the one of the one or more alternative transport mechanisms as the transport mechanism, determine whether to use a first one of the one or more alternative transport mechanisms or a second one of the one or more alternative transport mechanisms as the transport mechanism based at least in part on the at least one attribute of the data to be transferred.

* * * * *